(12) United States Patent
Kalkunte et al.

(10) Patent No.: US 7,570,639 B2
(45) Date of Patent: **\*Aug. 4, 2009**

(54) MULTICAST TRUNKING IN A NETWORK DEVICE

(75) Inventors: Mohan Kalkunte, Sunnyvale, CA (US); Venkateshwar Buduma, San Jose, CA (US)

(73) Assignee: Broadcom Corporation, Irvine, CA (US)

( \* ) Notice: Subject to any disclaimer, the term of this patent is extended or adjusted under 35 U.S.C. 154(b) by 551 days.

This patent is subject to a terminal disclaimer.

(21) Appl. No.: 11/289,499

(22) Filed: Nov. 30, 2005

(65) Prior Publication Data

US 2006/0114902 A1 Jun. 1, 2006

Related U.S. Application Data

(60) Provisional application No. 60/631,578, filed on Nov. 30, 2004, provisional application No. 60/686,425, filed on Jun. 2, 2005.

(51) Int. Cl.
*H04L 12/28* (2006.01)
(52) U.S. Cl. ...................................... 370/389
(58) Field of Classification Search .................. 370/389
See application file for complete search history.

(56) References Cited

U.S. PATENT DOCUMENTS 6,335,932 B2   1/2002   Kadambi

2003/0142668 A1\*   7/2003   Wyatt .......................... 370/389

OTHER PUBLICATIONS

Non-final office action mailed on Mar. 19, 2009, in U.S. Appl. No. 11/289,368.
Non-final office action mailed on Mar. 19, 2009, in U.S. Appl. No. 12/135,720.

\* cited by examiner

*Primary Examiner*—Chirag Shah
*Assistant Examiner*—Otis L Thompson, Jr.

(57) ABSTRACT

A network device for uniform distribution of non-unicast traffic, such as layer 2 broadcast, layer 2 multicast, unknown unicast and layer 3 multicast on a truch group. The network device includes at least one trunk group including a plurality of physical ports. The network device is connected to at least one other network device by a number of the plurality of physical ports. The network device also includes a table with a plurality of entries, wherein each entry is associated with the number of the plurality of physical ports on the network device. Each entry specifies if a packet should be transmitted on one of the plurality of physical ports. The network device further includes hashing means for hashing a predefined number of bits from predefined fields in the packet to select one entry in the table. The selected entry is used to identify a destination port. The network device also includes transmitting means for transmitting the packet to the destination port.

17 Claims, 4 Drawing Sheets

| | Port 1 = Block | Port 2 = Block | ← 402a |

Trunk Group Table 400

Figure 4a

| | Port 4 = Block | Port 6 = Block | ← 402b |

Trunk Group Table 400

Figure 4b

| | Port 10 = Block | Port 11 = Allow | ← 402c |

Trunk Group Table 400

Figure 4c

MULTICAST TRUNKING IN A NETWORK DEVICE

CROSS-REFERENCE TO RELATED APPLICATIONS

This application claims priority of U.S. Provisional Patent Application Ser. No. 60/631,578, filed on Nov. 30, 2004 and U.S. Provisional Patent Application Ser. No. 60/686,425, filed on Jun. 2, 2005. The subject matter of this earlier filed application is hereby incorporated by reference.

BACKGROUND OF THE INVENTION

1. Field of the Invention

The present invention relates to a network device in a data network and more particularly to a system and method of logically linking multiple ports into a signal port of the network device and transmitting multicast packets through the logical port.

2. Description of the Related Art

A packet switched network may include one or more network devices, such as a Ethernet switching chip, each of which includes several modules that are used to process information that is transmitted through the device. Specifically, the device includes an ingress module, a Memory Management Unit (MMU) and an egress module. The ingress module includes switching functionality for determining to which destination port a packet should be directed. The MMU is used for storing packet information and performing resource checks. The egress module is used for performing packet modification and for transmitting the packet to at least one appropriate destination port. One of the ports on the device may be a CPU port that enables the device to send and receive information to and from external switching/routing control entities or CPUs.

A current network device may support physical ports and logical/trunk ports, wherein the trunk ports are a set of physical external ports that act as a single link layer port. Ingress and destination ports on the network device may be physical external ports or trunk ports. By logically combining multiple physical ports into a trunk port, the network may provide greater bandwidth for connecting multiple devices. Furthermore, if one port in the trunk fails, information may still be sent between connected devices through other active ports of the trunk. As such, trunk ports also enable the network to provide greater redundancy between connected network devices.

In order to transmit information from one network device to another, the sending device has to determine if the packet is being transmitted to a trunk destination port. If the destination port is a trunk port, the sending network device must dynamically select a physical external port in the trunk on which to transmit the packet. The dynamic selection must account for load sharing between ports in a trunk so that outgoing packets are distributed across the trunk.

Typically, each packet entering a network device may be one of a unicast packet, a broadcast packet, a mulitcast packet, or an unknown unicast packet. The unicast packet is one that is to be transmitted to a specific destination address that can be determined by an ingress network device. The broadcast packet is typically sent to all ports by the ingress network device and the multicast packet is sent to multiple identifiable ports by the ingress network device. To multicast or broadcast a packets specific bits in the packet are set prior to transmission of the packet to the ingress network device. An unknown unicast packet is a unicast packet in which the ingress network device cannot determine the port associated with the destination address. So the ingress network device broadcasts the packet which is ignored by all ports except the intended but previously unknown destination port. When the previously unknown destination port sends a response message to the ingress network device, all network devices "learn" the associated destination address. Thereafter, any unicast packet sent to the previously unknown port is transmitted as a traditional unicast packet.

When a broadcast/multicast packet is to be sent on a trunk group that includes multiple physical ports, the ingress device must send the packet to every device in the network with sending duplicate copies of the packet on a given trunk. Current network devices include two types of multicast methods: a layer 2 multicast/broadcast/unknown unicast and a layer 3 multicast. As such, network devices include three masks: one for layer 3, layer 2 and broadcast. The network devices use these masks to select a destination port on which to send the packet. However, these masks are limiting and do not provide for adequate distribution of the traffic on a given trunk group

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein:

FIGS. 4a-4c illustrate a trunk group table that is used in an embodiment of the present invention.

DETAILED DESCRIPTION OF PREFERRED EMBODIMENTS

Reference will now be made to the preferred embodiments of the present invention, examples of which are illustrated in the accompanying drawings.

Figure 1:
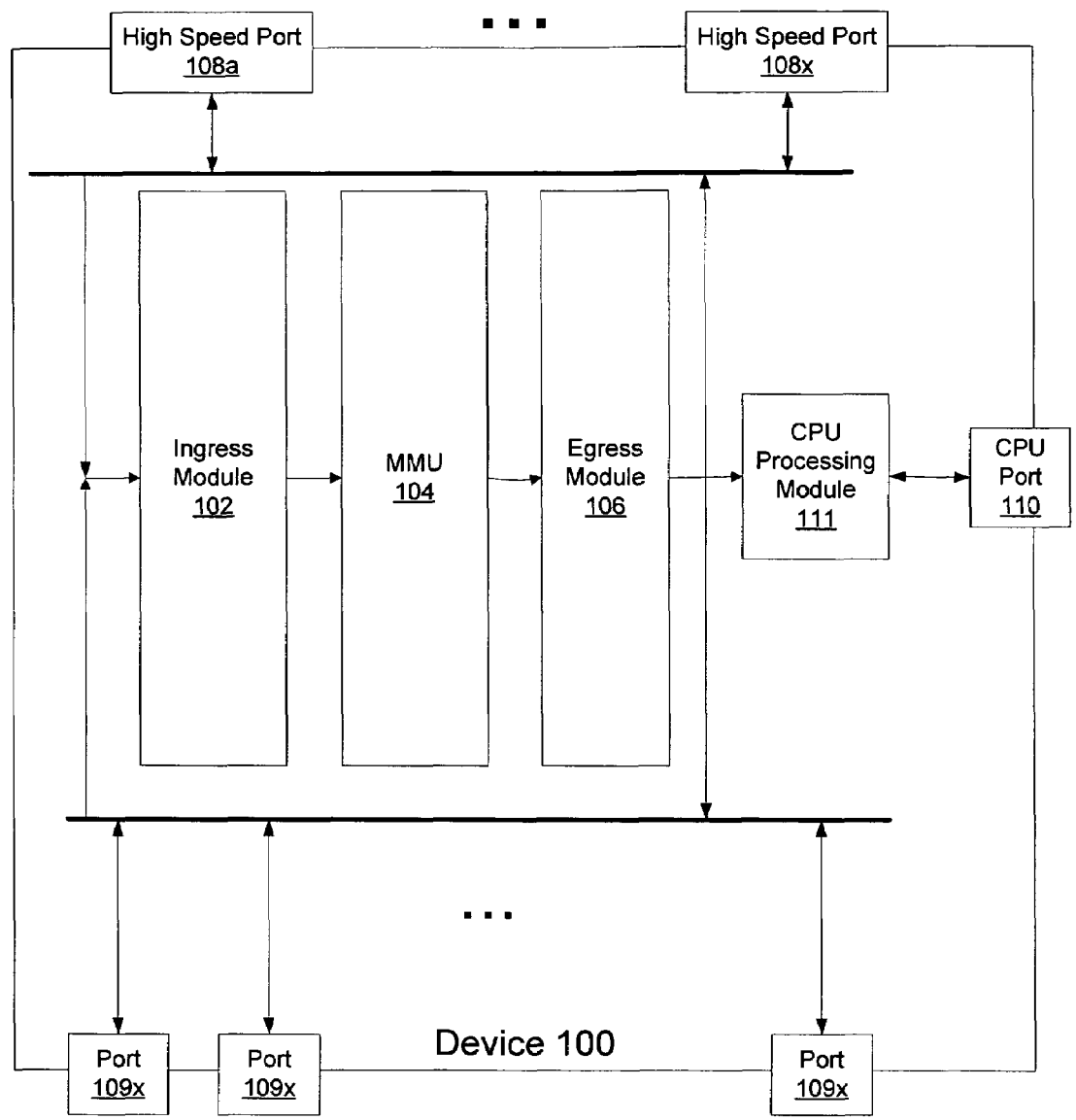
FIG. 1 illustrates a network device in which an embodiment of the present invention may be implemented.

FIG. 1 illustrates a network device, such as a switching chip, in which an embodiment the present invention may be implemented. Device 100 includes an ingress module 102, a MMU 104, and an egress module 106. Ingress module 102 is used for performing switching functionality on an incoming packet. MMU 104 is used for storing packets and performing resource checks on each packet. Egress module 106 is used for performing packet modification and transmitting the packet to an appropriate destination port. Each of ingress module 102, MMU 104 and Egress module 106 includes multiple cycles for processing instructions generated by that module. Device 100 implements a pipelined approach to process incoming packets. The device 100 has the ability of the pipeline to process, according to one embodiment, one packet every clock cycle. According to one embodiment of the invention, the device 100 includes a 133.33 MHz core clock. This means that the device 100 architecture is capable of processing 133.33 M packets/sec.

Device 100 may also include one or more internal fabric high speed ports, for example a HiGig™, high speed port 108a-108x, one or more external Ethernet ports 109a-109x, and a CPU port 110. High speed ports 108a-108x are used to interconnect various network devices in a system and thus form an internal switching fabric for transporting packets between external source ports and one or more external destination ports. As such, high speed ports 108a-108x are not externally visible outside of a system that includes multiple interconnected network devices. CPU port 110 is used to send and receive packets to and from external switching/routing control entities or CPUs. According to an embodiment of the invention, CPU port 110 may be considered as one of external Ethernet ports 109a-109x. Device 100 interfaces with external/off-chip CPUs through a CPU processing module 111, such as a CMIC, which interfaces with a PCI bus that connects device 100 to an external CPU.

Network traffic enters and exits device 100 through external Ethernet ports 109a-109x. Specifically, traffic in device 100 is routed from an external Ethernet source port to one or more unique destination Ethernet ports 109a-109x. In one embodiment of the invention, device 100 supports physical Ethernet ports and logical (trunk) ports. A physical Ethernet port is a physical port on device 100 that is globally identified by a global port identifier. In an embodiment, the global port identifier includes a module identifier and a local port number that uniquely identifies device 100 and a specific physical port. The trunk ports are a set of physical external Ethernet ports that act as a single link layer port. Each trunk port is assigned a global a trunk group identifier (TGID). According to an embodiment, device 100 can support up to 128 trunk ports, with up to 8 members per trunk port, and up to 29 external physical ports. Destination ports 109a-109x on device 100 may be physical external Ethernet ports or trunk ports. If a destination port is a trunk port, device 100 dynamically selects a physical external Ethernet port in the trunk by using a hash to select a member port. As explained in more detail below, the dynamic selection enables device 100 to allow for dynamic load sharing between ports in a trunk.

Once a packet enters device 100 on a source port 109a-109x, the packet is transmitted to ingress module 102 for processing. Packets may enter device 100 from a XBOD or a GBOD. In an embodiment, the XBOD is a block that has one 10GE/12G MAC and supports packets from high speed ports 108a-108x. The GBOD is a block that has 12 10/100/1G MAC and supports packets from ports 109a-109x.

Figure 2:
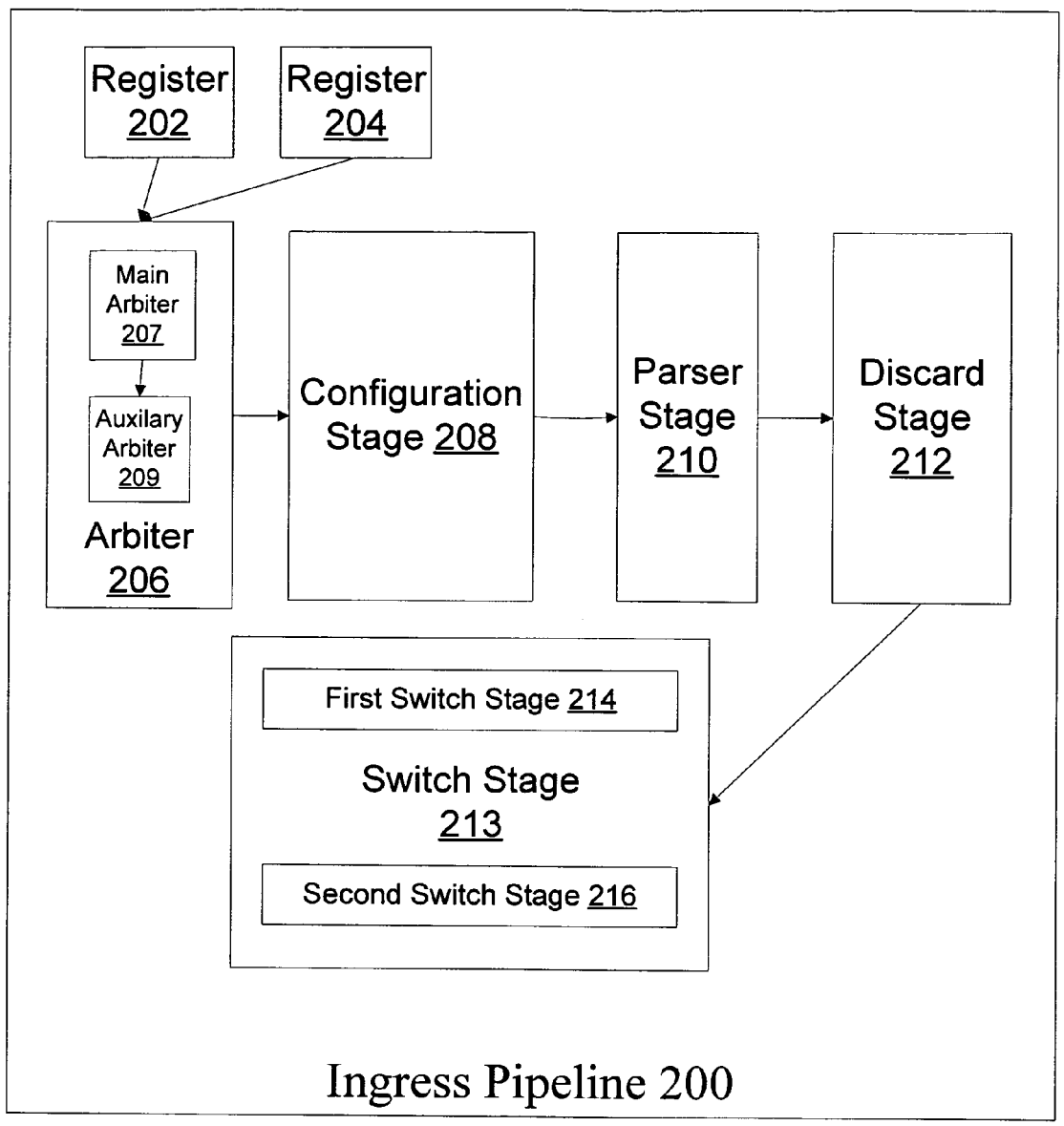
FIG. 2 illustrates a centralized ingress pipeline architecture, according to one embodiment of the present invention.

FIG. 2 illustrates a centralized ingress pipeline architecture 200 of ingress module 102. Ingress pipeline 200 processes incoming packets, primarily determines an egress bitmap and, in some cases, figures out which parts of the packet may be modified. Ingress pipeline 200 includes a data holding register 202, a module header holding register 204, an arbiter 206, a configuration stage 208, a parser stage 210, a discard stage 212 and a switch stage 213. Ingress pipeline 200 receives data from the XBOD, GBOD or CPU processing module 111 and stores cell data in data holding register 202. Arbiter 206 is responsible for scheduling requests from the GBOD, the XBOD and CPU. Configuration stage 208 is used for setting up a table with all major port-specific fields that are required for switching. Parser stage 210 parses the incoming packet and a high speed module header, if present, handles tunnelled packets through Layer 3 (L3) tunnel table lookups, generates user defined fields, verifies Internet Protocol version 4 (IPv4) checksum on outer IPv4 header, performs address checks and prepares relevant fields for downstream lookup processing. Discard stage 212 looks for various early discard conditions and either drops the packet and/or prevents it from being sent through pipeline 200. Switching stage 213 performs all switch processing in ingress pipeline 200, including address resolution.

According to one embodiment of the invention, the ingress pipeline includes one 1024-bit cell data holding register 202 and one 96-bit module header register 204 for each XBOD or GBOD. Data holding register 202 accumulates the incoming data into one contiguous 128-byte cell prior to arbitration and the module header register 204 stores an incoming 96-bit module header for use later in ingress pipeline 200. Specifically, holding register 202 stores incoming status information.

Ingress pipeline 200 schedules requests from the XBOD and GBOD every six clock cycles and sends a signal to each XBOD and GBOD to indicate when the requests from the XBOD and GBOD will be scheduled. CPU processing module 111 transfers one cell at a time to ingress module 102 and waits for an indication that ingress module 102 has used the cell before sending subsequent cells. Ingress pipeline 200 multiplexes signals from each of XBOD, GBOD and CPU processing based on which source is granted access to ingress pipeline 200 by arbiter 206. Upon receiving signals from the XBOD or GBOD, a source port is calculated by register buffer 202, the XBOD or GBOD connection is mapped to a particular physical port number on device 100 and register 202 passes information relating to a scheduled cell to arbiter 206.

When arbiter 206 receives information from register buffer 202, arbiter 206 may issue at least one of a packet operation code, an instruction operation code or a FP refresh code, depending on resource conflicts. According to one embodiment, the arbiter 206 includes a main arbiter 207 and auxiliary arbiter 209. The main arbiter 207 is a time-division multiplex (TDM) based arbiter that is responsible for scheduling requests from the GBOD and the XBOD, wherein requests from main arbiter 207 are given the highest priority. The auxiliary arbiter 209 schedules all non XBOD/GBOD requests, including CPU packet access requests, CPU memory/register read/write requests, learn operations, age operations, CPU table insert/delete requests, refresh requests and rate-limit counter refresh request. Auxiliary arbiter's 209 requests are scheduled based on available slots from main arbiter 207.

When the main arbiter 207 grants an XBOD or GBOD a slot, the cell data is pulled out of register 202 and sent, along with other information from register 202, down ingress pipeline 200. After scheduling the XBOD/GBOD cell, main arbiter 207 forwards certain status bits to auxiliary arbiter 209.

The auxiliary arbiter 209 is also responsible for performing all resource checks, in a specific cycle, to ensure that any operations that are issued simultaneously do not access the same resources. As such, auxiliary arbiter 209 is capable of scheduling a maximum of one instruction operation code or packet operation code per request cycle. According to one embodiment, auxiliary arbiter 209 implements resource check processing and a strict priority arbitration scheme. The resource check processing looks at all possible pending requests to determine which requests can be sent based on the resources that they use. The strict priority arbitration scheme implemented in an embodiment of the invention requires that CPU access request are given the highest priority, CPU packet transfer requests are given the second highest priority, rate refresh request are given the third highest priority, CPU memory reset operations are given the fourth highest priority and Learn and age operations are given the fifth highest priority by auxiliary arbiter 209. Upon processing the cell data, auxiliary arbiter 209 transmits packet signals to configuration stage 208.

Configuration stage 208 includes a port table for holding all major port specific fields that are required for switching, wherein one entry is associated with each port. The configuration stage 208 also includes several registers. When the configuration stage 208 obtains information from arbiter 206, the configuration stage 208 sets up the inputs for the port table during a first cycle and multiplexes outputs for other port specific registers during a second cycle. At the end of the second cycle, configuration stage 208 sends output to parser stage 210.

Parser stage 210 manages an ingress pipeline buffer which holds the 128-byte cell as lookup requests traverse pipeline 200. When the lookup request reaches the end of pipeline 200, the data is pulled from the ingress pipeline buffer and sent to MMU 104. If the packet is received on a high speed port, a 96-bit module header accompanying the packet is parsed by parser stage 210. After all fields have been parsed, parser stage 210 writes the incoming cell data to the ingress pipeline buffer and passes a write pointer down the pipeline. Since the packet data is written to the ingress pipeline buffer, the packet data need not be transmitted further and the parsed module header information may be dropped. Discard stage 212 then looks for various early discard conditions and, if one or more of these conditions are present, discard stage drops the packet and/or prevents it from being sent through the chip.

Switching stage 213 performs address resolution processing and other switching on incoming packets. According to an embodiment of the invention, switching stage 213 includes a first switch stage 214 and a second switch stage 216. First switch stage 214 resolves any drop conditions, performs BPDU processing, checks for layer 2 source station movement and resolves most of the destination processing for layer 2 and layer 3 unicast packets, layer 3 multicast packets and IP multicast packets. The first switch stage 214 also performs protocol packet control switching by optionally copying different types of protocol packets to the CPU or dropping them. The first switch stage 214 further performs all source address checks and determines if the layer 2 entry needs to get learned or re-learned for station movement cases. The first switch stage 214 further performs destination calls to determine how to switch packet based on a destination switching information. Specifically, the first switch stage 214 figures out the destination port for unicast packets or port bitmap of multicast packets, calculates a new priority, optionally traps packets to the CPU and drops packets for various error conditions. The first switch stage 214 further handles high speed switch processing separate from switch processing from port 109a-109i and switches the incoming high speed packet based on the stage header operation code.

The second switch stage 216 then performs Field Processor (FP) action resolution, source port removal, trunk resolution, high speed trunking, port blocking, CPU priority processing, end-to-end Head of Line (HOL) resource check, resource check, mirroring and maximum transfer length (MTU) checks for verifying that the size of incoming/outgoing packets is below a maximum transfer length. The second switch stage 216 takes first switch stage 216 switching decision, any layer routing information and FP redirection to produce a final destination for switching. The second switch stage 216 also removes the source port from the destination port bitmap and performs trunk resolution processing for resolving the trunking for the destination port for unicast packets, the ingress mirror-to-port and the egress mirror-to-port. The second switch stage 216 also performs high speed trunking by checking if the source port is part of a high speed trunk group and, if it is, removing all ports of the source high speed trunk group. The second switch stage 216 further performs port blocking by performing masking for a variety of reasons, including meshing and egress masking.

Figure 3:
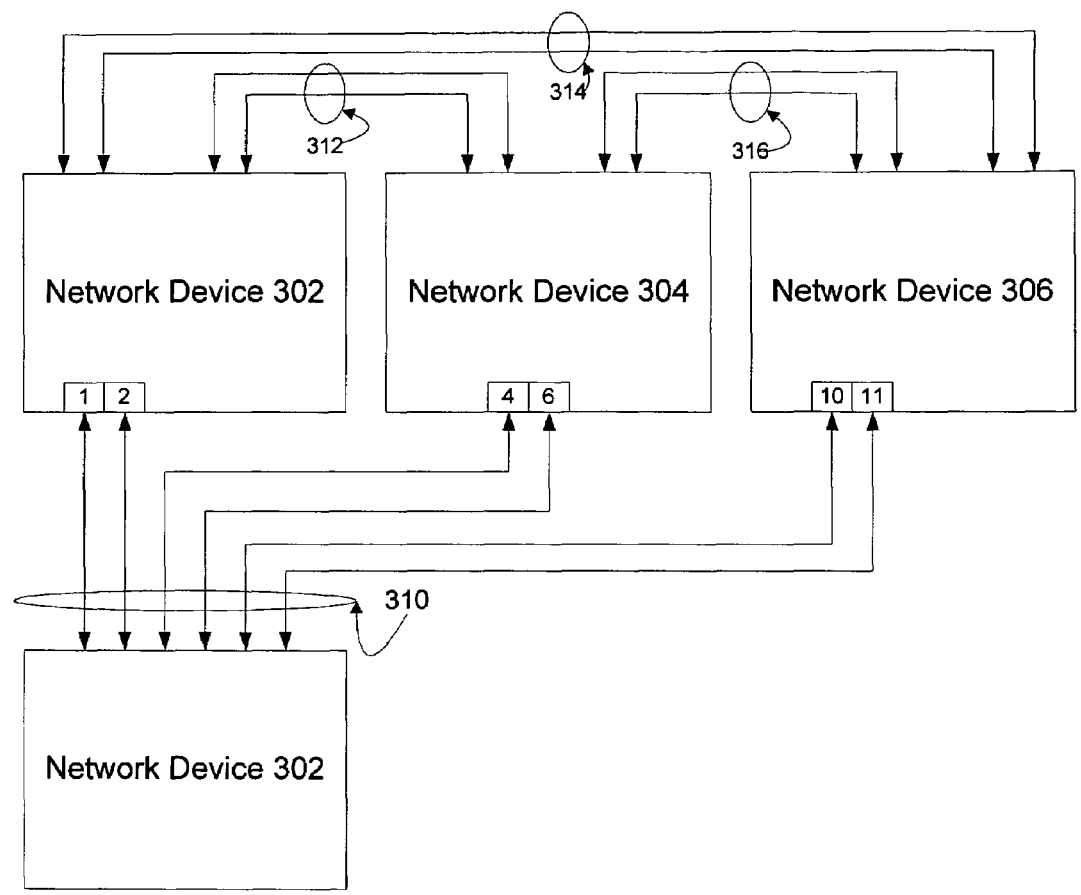
FIG. 3 illustrates an embodiment of the network in which multiple network devices are connected by trunks.

FIG. 3 illustrates an embodiment of a network in which multiple network devices, as described above, are connected by trunks. According to FIG. 3, network 300 includes devices 302-308 which are connected by trunks 310-316. Device 302 includes ports 1 and 2 in trunk group 310, device 304 includes ports 4 and 6 in trunk group 310 and device 306 includes ports 10 and 11 in trunk group 310. Each of network devices 302-308 may receive unicast or multicast packets that must be transmitted to an appropriate destination port.

As noted above, an embodiment of device 100 may support up to 128 trunk ports with up to 8 members per trunk port. When the incoming packet is a multicast, broadcast or unknown unicast packet, the receiving device uses an associated trunk block table 400, as illustrated in FIGS. 4a-4c. There are two types of multicast implemented in an embodiment of the invention: multicast/broadcast/unknown unicast for layer 2, and layer 3 multicast.

In an embodiment of the invention, trunk block table 400 is a 16 entry table that includes a block mask for specifying whether or not a packet should be sent on a given trunk port. Therefore, trunk block table 400 enables a sending device to select only one port, in a given trunk group, for forwarding a packet. One embodiment of the invention teaches that each of devices 302-308 has it own trunk block table 400. For example, trunk group table 4a is associated with device 302, trunk group table 4b is associated with device 304 and trunk group table 4c is associated with device 306. According to the illustrations in FIG. 3, if a packet is to be sent out on port 11 of trunk group 310, an entry 402a is set in trunk block table 400, as shown in FIG. 4a, associated with device 302. In entry 402a, values for ports one and two are set to block the packet from being sent out from those ports. An associated entry 402b in trunk block table 400, as shown in FIG. 4b, associated with device 304 is also set. In entry 402b, values for ports four and six are set to block the packet from being sent out from those ports. On device 306, an associated entry 402c, as shown in FIG. 4c, is set in associated trunk group table 400. In entry 402c, the value for port ten is set to block packets from being sent out on that port, however, the value for port 11 is set to allow packets and as such the packet is transmitted on port 11.

Although in one embodiment of the invention trunk group table 400 in each of devices 302-308 is a static 16 entry table, each of the 16 entries in each trunk group table can be programmed in different ways for a specific trunk group. To ensure consistency and that the same entry is selected in each table 400 across the network, i.e., that the same entry is selected in the trunk group table associated with device 302, in the trunk group table associated with device 304 and in the trunk group table associated with device 306, in one embodiment of the invention, if the packet is a layer 2 broadcast, multicast or unknown unicast packet, the sending device uses a predefined number of bits from predefined fields to determine the trunk selection. Specifically, four bits are selected from each of the source address, destination address and the source port trunk group identifier and the selected fields are XORed to obtain a value that is used to index table 400. Alternatively, four bits are selected from each of the source address and the destination address and two bits are selected from each of source port and source module and the selected fields are XORed to obtain a value that is used to index table 400. If the packet is a IP multicast packet, a predefined number of bits are selected from each of the source IP address, destination IP address and the source port trunk group identifier and the selected fields are XORed to obtain a value that is used to index table 400. Alternatively, a predefined number of bits are selected from each of the source IP address and the destination IP address and two bits are selected from each of source port and source module and the selected fields are XORed to obtain a value that is used to index table 400. In one embodiment of the invention, the predefined number of bits is four. Since the information used in the trunk group selection is the same for each device, each device 302-308 performs the same hashing operation in order to select the appropriate entry from trunk block table 400.

Specifically, in one embodiment of the invention, if the packet is layer 2 broadcast, multicast or unknown unicast packet, SA[3:0], DA[3:0], SRC_PORT[1:0] and SRC_MO-DID[1:0] are XORed to obtain a four bit value that is used to index table 400. Alternatively, SA[3:0], DA[3:0], SRC_PORT_TGID[3:0] are XORed to obtain a four bit value that is used to index table 400. If the packet is IP multicast packet, SIP[3:0], DIP[3:0], SRC_PORT[1:0] and SRC_MO-DID[1:0] are XORed to obtain a four bit value that is used to index table 400. Alternatively, SIP[3:0], DIP[3:0], SRC_PORT_TGID[3:0] are XORed to obtain a four bit value that is used to index table 400.

The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

With respect to the present invention, network devices may be any device that utilizes network data, and can include switches, routers, bridges, gateways or servers. In addition, while the above discussion specifically mentions the handling of packets, packets, in the context of the instant application, can include any sort of datagrams, data packets and cells, or any type of data exchanged between network devices.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. A network device for distribution of non-unicast traffic on a trunk group by selecting an appropriate port from the trunk group on which to transmit a non-unicast packet, the network device comprising:
    at least one trunk group comprising a plurality of physical ports, wherein the network device is connected to at least one other network device by a number of the plurality of physical ports;
    a table comprising a plurality of entries, wherein each entry is associated with the number of the plurality of physical ports on the network device and each entry specifies if a packet should be transmitted on one of the plurality of physical ports;
    hashing means configured to hash a predefined number of bits from a source address, a destination address, and a source port trunk group identifier in the packet to obtain an index to select one entry in the table, wherein the selected entry is used to identify a destination port; and
    transmitting means for transmitting the packet to the destination port.

2. The network device according to claim 1, wherein the table is configured as a 16 entry table, wherein each entry comprises a field that is associated with one of the number of the plurality of physical ports.

3. The network device according to claim 1, wherein the table is configured to set one field that is associated with one of the plurality of physical ports to allow the packet transmission.

4. The network device according to claim 1, wherein the table is configured to set fields that are associated with the number of the plurality of physical ports to block the packet transmission.

5. The network device according to claim 1, wherein the table is configured such that entries in the table are programmed in different way for the trunk group.

6. The network device according to claim 1, wherein the hashing means is configured to hash, if the packet is one of a layer 2 broadcast, multicast or unknown unicast, the predefined number of bits from the source address, the destination address, source port and a source module identifier to obtain the index for accessing one entry in the table.

7. The network device according to claim 1, wherein the hashing means is configured to hash, if the packet is an IP multicast, the predefined number of bits from a source IP address, a destination IP address and a source port trunk group identifier to obtain the index for accessing one entry in the table.

8. The network device according to claim 1, wherein the hashing means is configured to hash, if the packet is an IP multicast, the predefined number of bits from a source IP address, a destination IP address, a source port and a source module identifier to obtain the index for accessing one entry in the table.

9. A method for uniform distribution of non-unicast traffic on a trunk group by selecting an appropriate port from the trunk group on which to transmit a non-unicast packet, the method comprising:
    connecting the network device to at least one other network device by a number of a plurality of physical ports in at least one trunk group;
    storing a plurality of entries in a table, wherein each entry is associated with the number of the plurality of physical ports;
    specifying in each entry if a packet should be transmitted on one of the plurality of physical ports;
    hashing a predefined number of bits from a source address, a destination address, and a source port trunk group identifier in the packet to obtain an index to select one entry in the table;
    identifying a destination port by a selected entry; and
    transmitting the packet to the destination port.

10. The method according to claim 9, further comprising storing at least one field in each entry, wherein the at least one field is associated with one of the number of the plurality of physical ports.

11. The method according to claim 9, further comprising setting one field that is associated with one of the plurality of physical ports to allow the packet transmission.

12. The method according to claim 9, further comprising setting fields that are associated with the number of the plurality of physical ports to block the packet transmission.

13. The method according to claim 9, further comprising programming entries in the table in different way for the trunk group.

14. The method according to claim 9, wherein the hashing includes hashing, if the packet is one of a layer 2 broadcast, multicast or unknown unicast, the predefined number of bits from the source address, the destination address, source port and a source module identifier to obtain the index for accessing one entry in the table.

15. The method according to claim 9, wherein the hashing includes hashing, if the packet is an IP multicast, a predefined number of bits from a source IP address, a destination IP address and a source port trunk group identifier to obtain the index for accessing one entry in the table.

16. The method according to claim 9, wherein the hashing includes hashing, if the packet is an IP multicast, a predefined number of bits from a source IP address, a destination IP address, a source port and a source module identifier to obtain the index for accessing one entry in the table.

17. An apparatus for uniform distribution of non-unicast traffic on a trunk group by selecting an appropriate port from the trunk group on which to transmit a non-unicast packet, the apparatus comprising:

- connecting means for connecting the network device to at least one other network device by a number of a plurality of physical ports in at least one trunk group;
- storing means for storing a plurality of entries in a table, wherein each entry is associated with the number of the plurality of physical ports;
- specifying means for specifying in each entry if a packet should be transmitted on one of the plurality of physical ports;
- hashing means for hashing a predefined number of bits from a source address, a destination address, source port and a source port module identifier in the packet to obtain an index to select one entry in the table;
- identifying means for identifying a destination port by a selected entry; and
- transmitting means for transmitting the packet to the destination port.

\* \* \* \* \*